US009499118B2

(12) United States Patent
Jindal et al.

(10) Patent No.: US 9,499,118 B2
(45) Date of Patent: Nov. 22, 2016

(54) AIRBAG FOR OBLIQUE VEHICLE IMPACTS

(71) Applicant: Ford Global Technologies, LLC, Dearborn, MI (US)

(72) Inventors: Pardeep Kumar Jindal, Canton, MI (US); Djamal Eddine Midoun, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/694,215

(22) Filed: Apr. 23, 2015

(65) Prior Publication Data

US 2016/0311392 A1 Oct. 27, 2016

(51) Int. Cl.
| | |
|---|---|
| *B60R 21/16* | (2006.01) |
| *B60R 21/231* | (2011.01) |
| *B60R 21/0136* | (2006.01) |
| *B60R 21/206* | (2011.01) |
| *B60R 21/2338* | (2011.01) |

(52) U.S. Cl.
CPC ......... *B60R 21/231* (2013.01); *B60R 21/0136* (2013.01); *B60R 21/206* (2013.01); *B60R 21/2338* (2013.01); *B60R 2021/23169* (2013.01); *B60R 2021/23176* (2013.01)

(58) Field of Classification Search
CPC .............. B60R 21/2338; B60R 2021/23382; B60R 2021/23384
USPC .......................................... 280/743.1, 743.2
See application file for complete search history.

(56) References Cited

U.S. PATENT DOCUMENTS

| | | | | |
|---|---|---|---|---|
| 6,422,597 | B1* | 7/2002 | Pinsenschaum | ...... B60R 21/233 280/735 |
| 6,832,778 | B2* | 12/2004 | Pinsenschaum | ...... B60R 21/233 280/739 |
| 7,540,534 | B2 | 6/2009 | Hasebe et al. | |
| 7,597,355 | B2* | 10/2009 | Williams | ............ B60R 21/2338 280/739 |
| 7,628,422 | B2* | 12/2009 | Fukawatase | ........ B60R 21/2338 280/739 |
| 7,651,130 | B2* | 1/2010 | Bauberger | .......... B60R 21/2338 280/743.2 |
| 7,661,700 | B2 | 2/2010 | Imamura et al. | |
| 7,690,683 | B2 | 4/2010 | Parks et al. | |
| 7,942,443 | B2 | 5/2011 | Dennis et al. | |

(Continued)

FOREIGN PATENT DOCUMENTS

| | | |
|---|---|---|
| DE | 10311006 B4 | 10/2009 |
| GB | 2340458 | 2/2000 |

(Continued)

OTHER PUBLICATIONS

Stephen Summers, NHTSA Vehicle Safety Research, "Advanced Restraint System (ARS)", Summer/Fall 2010, 19 pages.

*Primary Examiner* — Toan To
(74) *Attorney, Agent, or Firm* — Frank A. MacKenzie; Bejin Bieneman PLC

(57) ABSTRACT

An airbag system for a vehicle includes an inflator and an airbag defining an inflation chamber in communication with the inflator. The airbag includes a first extension and a second extension spaced from each other and each in communication with the inflation chamber. The first extension and the second extension are each selectively inflatable from an undeployed position to a deployed position. A controller is programmed to provide instructions to release one or both of the first and second extensions to the deployed position in response at least to a detected direction of an impact of the vehicle.

16 Claims, 6 Drawing Sheets

(56) References Cited

U.S. PATENT DOCUMENTS

| | | | |
|---|---|---|---|
| 7,992,897 | B2 | 8/2011 | Sekino et al. |
| 8,096,578 | B2 | 1/2012 | Wigger et al. |
| 8,191,925 | B2* | 6/2012 | Williams ............ B60R 21/2338 280/739 |
| 8,272,667 | B2 | 9/2012 | Schneider et al. |
| 8,292,323 | B2 | 10/2012 | Matsushima et al. |
| 9,027,962 | B1* | 5/2015 | Jang .................... B60R 21/239 280/743.1 |
| 2007/0126219 | A1* | 6/2007 | Williams ............ B60R 21/2338 280/739 |
| 2008/0073891 | A1* | 3/2008 | Rose ................... B60R 21/2338 280/739 |
| 2011/0309605 | A1* | 12/2011 | Kumagai ............ B60R 21/2338 280/741 |
| 2013/0147171 | A1* | 6/2013 | Shin ................... B60R 21/2338 280/743.2 |
| 2015/0321636 | A1* | 11/2015 | Jang ................... B60R 21/2338 280/743.2 |

FOREIGN PATENT DOCUMENTS

| | | |
|---|---|---|
| JP | 5026098 B2 | 9/2012 |
| JP | 5212555 B2 | 6/2013 |

\* cited by examiner

AIRBAG FOR OBLIQUE VEHICLE IMPACTS

BACKGROUND

Vehicles may include a variety of airbags deployable during vehicle impacts to absorb energy from occupants of the vehicles during the impact. The airbag may be a component of an airbag assembly including a base supporting the airbag, and an inflation device in communication with the airbag for inflating the airbag from an uninflated position to an inflated position. The airbag modules may be supported on a steering wheel of the vehicle, an instrument panel of the vehicle, a headliner of the vehicle, etc.

The vehicle may include an impact sensing system in communication with the airbag assembly for sensing a vehicle impact and instructing the inflation device to inflate the airbag when a vehicle impact is sensed. The impact sensing system may sense the direction of the impact and may selectively inflate, or not inflate, certain airbags of the vehicle when an impact is sensed based on the type and magnitude of impact that is sensed, e.g., based on direction, magnitude, etc.

Vehicles are subject to a variety of impact tests. These impact tests may include those standardized by the National Highway Traffic and Safety Agency (NHTSA). These impact tests may include, for example, oblique impact tests. One such test is the small overlap rigid barrier (SORB) test in which the vehicle is impacted in a front corner of the vehicle at an oblique angle with a rigid barrier. In this test, the test dummy in the driver seat is urged forwardly and toward the impacted corner of the vehicle. Another type of impact test is the angular impact test, in which the test dummy in the driver seat is urged in a cross-vehicle direction toward the driver side door of the vehicle or toward the passenger side door of the vehicle.

DETAILED DESCRIPTION

Figure 1:
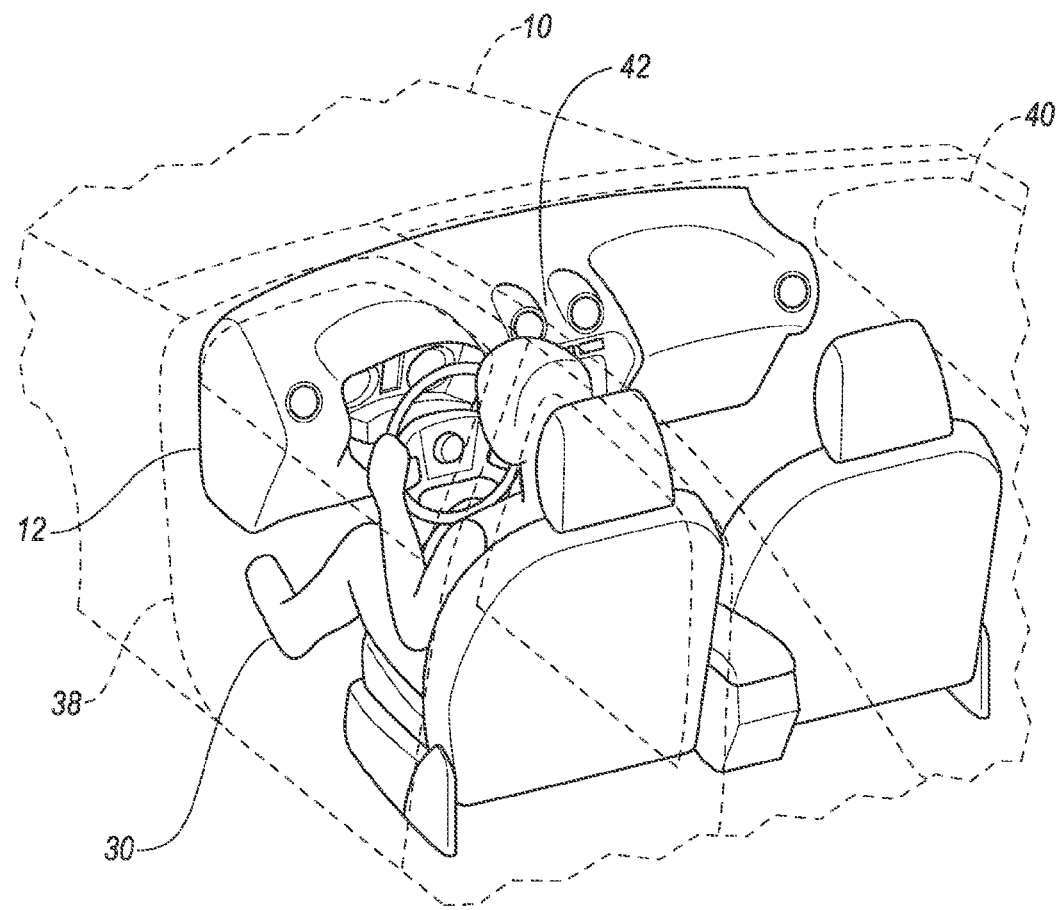
FIG. 1 is a perspective view of a portion of a vehicle including an a occupant seated in front of an instrument panel.
Figure 2:
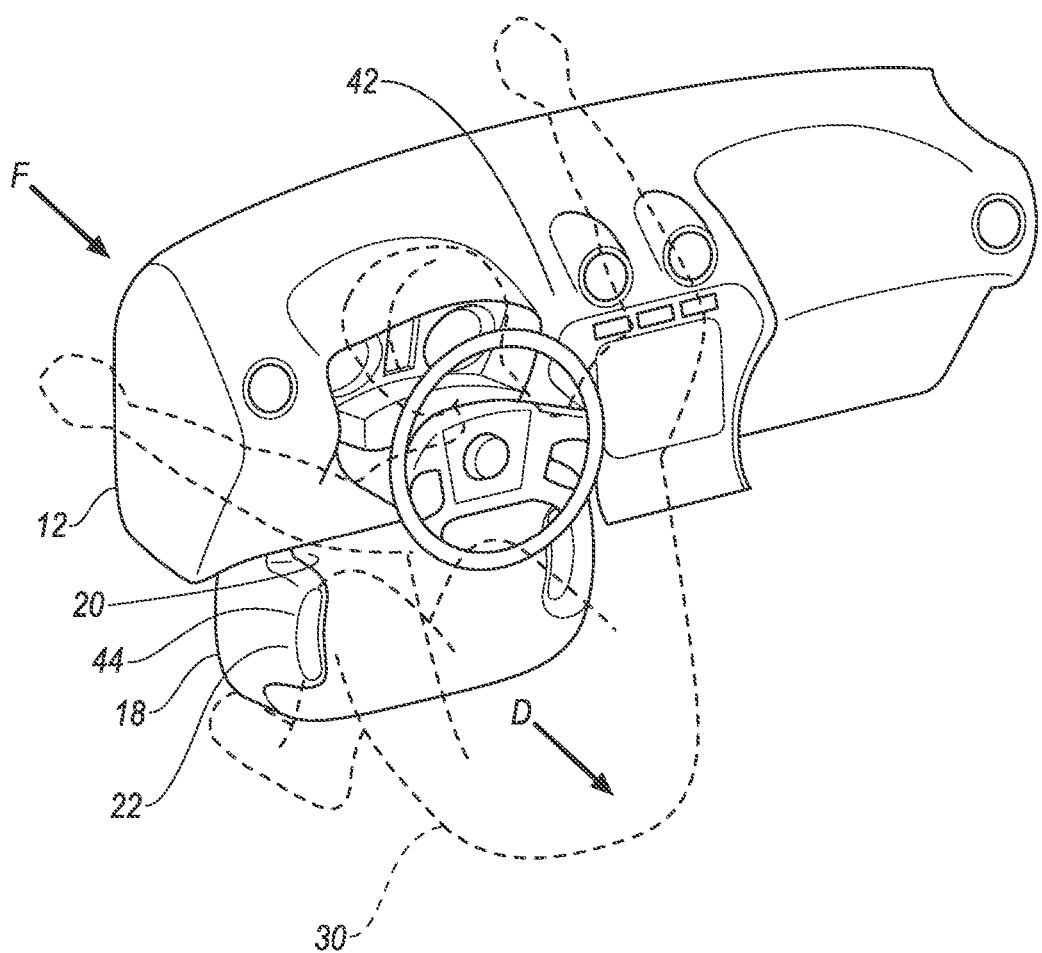
FIG. 2 is a perspective view of the occupant moving forward and to the left and impacting an airbag in an inflated position.
Figure 3:
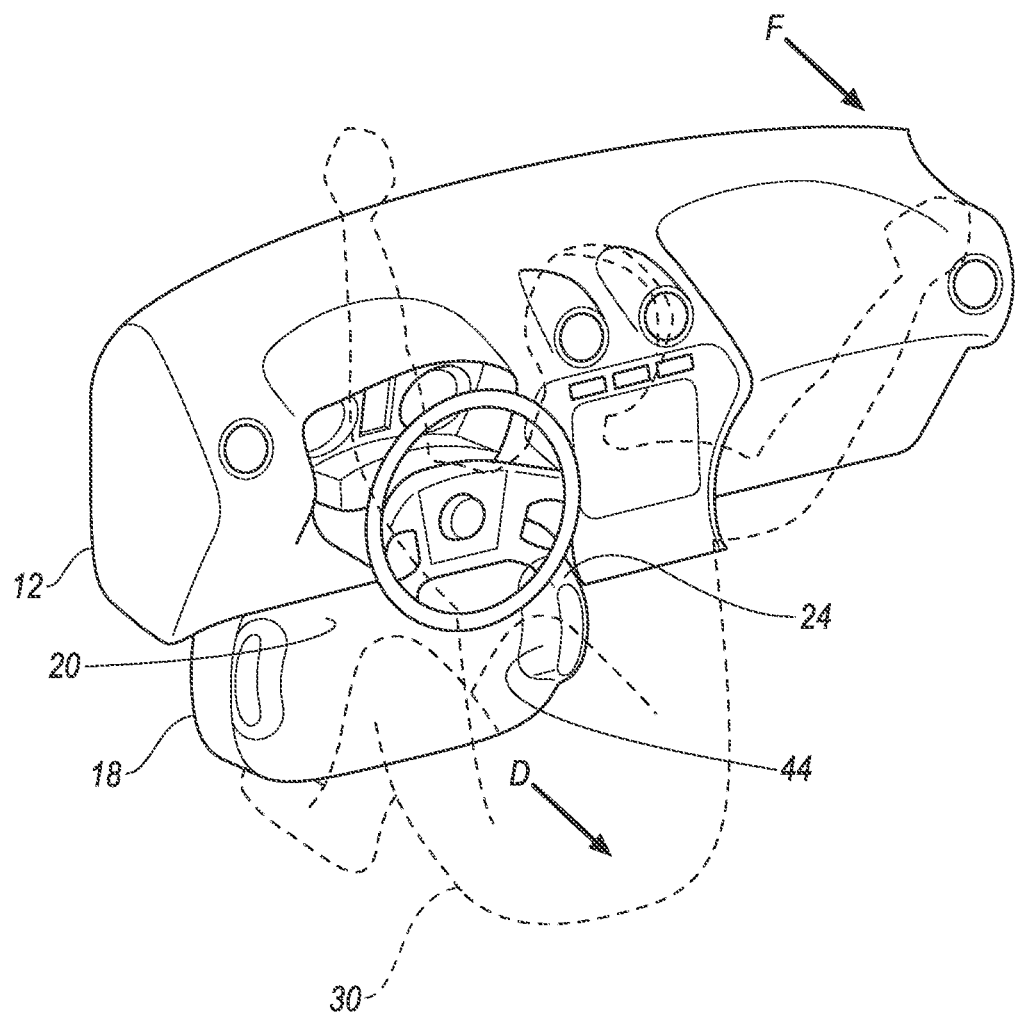
FIG. 3 is a perspective view of the occupant moving forward and to the right and impacting the airbag in the inflated position.

With reference to the Figures, wherein like numerals indicate like parts throughout the several views, a vehicle 10 including an instrument panel 12, shown in FIGS. 1-3, and an airbag assembly 14 supported by the instrument panel 12. The airbag assembly 14 includes a base 16, shown in FIGS. 4-9, supported by the instrument panel 12 and an airbag 18 supported by the base 16. The airbag 18 is inflatable from an uninflated position, as shown in FIG. 1, to an inflated position, as shown in FIGS. 2-9. The airbag 18 presents an impact surface 20 spaced from the instrument panel 12 in the inflated position. The airbag 18 includes at least one extension, e.g. a first extension 22 and a second extension 24, and a tether 26, 28 extending from the base 16 to the extension 22, 24 22, 24 in the uninflated position. The extension 22, 24 has a perimeter surface extending transversely from the impact surface 20 around a perimeter P of the extension 22, 24.

During an impact of the vehicle 10, the extension 22, 24 may be selectively inflated based on the direction of impact, as set forth further below. For example, as set forth further below, the extension 22, 24 may be inflated if a vehicle impact that may cause an occupant 30 to slide across the impact surface 20 of the airbag 18 in the inflated position is sensed. In this situation, the extension 22, 24 may slow and/or stop the sliding of the occupant 30 across the impact surface 20 of the airbag 18. Alternatively, if a vehicle impact is sensed that may cause the occupant 30 to impact the impact surface 20 without sliding across the impact surface 20, the extension 22, 24 may remain uninflated, which may allow faster inflation of the impact surface 20.

Figure 10:
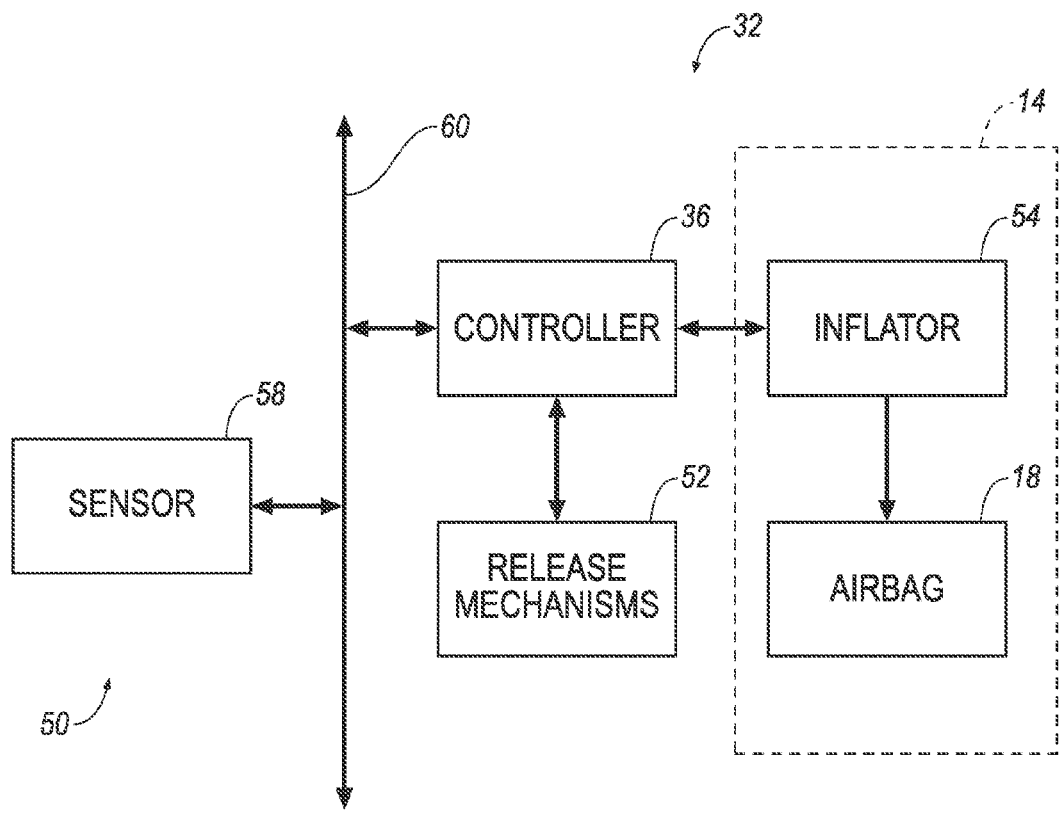
FIG. 10 is a schematic of an airbag system including an impact absorbing system and a controller.

Specifically, the airbag assembly 14 may be a component of an airbag system 32. The airbag assembly 14 may include an inflator 34 and the airbag 18 may define an inflation chamber (not numbered) in communication with the inflator 34. The first extension 22 and the second extension 24 are spaced from each other and are each in communication with the inflation chamber. Each of the first extension 22 and the second extension 24 are selectively inflatable from an undeployed position to a deployed position. The airbag system 32 includes a controller 36, as shown in FIG. 10, programmed to provide instructions to release one or both of the first extension 22 and the second extensions 24 to the deployed position in response at least to a detected direction of an impact of the vehicle 10.

In other words, in response to the detected direction of the impact of the vehicle 10, the controller 36 may be configured to provide instructions to release the first extension 22 to the deployed position and retain the second extension 24 in the undeployed position; release the second extension 24 to the deployed position and retain the first extension 22 in the undeployed position; retain both the first extension 22 and the second extension 24 in the undeployed position; or release both the first extension 22 and the second extension 24 to the deployed position. The direction of the impact of the vehicle 10 may be detected by an impact sensing system 50, as set forth further below.

For example, the controller 36 may be programmed to release the first extension 22, i.e., the left extension in the Figures, to the deployed position and retain the second extension 24, i.e., the right extension in the Figures, in the undeployed position upon detection of a vehicle impact that may urge the occupant 30 toward the left of the vehicle 10, e.g., a left SORB impact, a left oblique impact, a left angular impact, a left side impact, etc. For example, with reference to FIG. 2, when the vehicle 10 is subjected to a left oblique impact (identified with "F" in FIG. 2), the occupant 30 may be urged forward and to the left. The first extension 22 in the deployed position may slow and/or stop movement of the occupant 30 toward the left, e.g., toward the left door 38 of the vehicle 10. During forward and left motion of the occupant 30, the legs of the occupant 30 may slide along the impact surface 20 toward the left door 38 and may contact the first extension 22, as shown in FIG. 2, to slow and/or stop movement of the legs of the occupant 30 toward the left door 38. In other words, because the perimeter surface of the first extension 22 extends transversely from the impact surface 20, the first extension 22 catches the legs of the occupant 30 as the occupant 30 slides along the impact surface 20 to slow and/or stop movement of the legs of the occupant 30 toward the left door 38.

As another example, the controller 36 may be programmed to release the second extension 24 to the deployed position and retain the first extension 22 in the undeployed position, upon detection of a vehicle impact that may urge the occupant 30 toward the right of the vehicle 10, e.g., a right SORB impact, a right oblique impact, a right angular impact, a right side impact, etc. For example, with reference to FIG. 3, when the vehicle 10 is subjected to a right oblique impact (identified with "F" in FIG. 3), the occupant 30 may be urged forward and to the right. The second extension 24 in the deployed position may slow and/or stop movement of the occupant 30 toward the right, e.g., toward the right door 40 of the vehicle 10. During forward and right motion of the occupant 30, the legs of the occupant 30 may slide along the impact surface 20 toward the center console 42 and may contact the second extension 24, as shown in FIG. 3, to slow and/or stop movement of the legs of the occupant 30 toward the center console 42. In other words, because the perimeter surface of the second extension 24 extends transversely from the impact surface 20, the second extension 24 catches the legs of the occupant 30 as the occupant 30 slides along the impact surface 20 to slow and/or stop movement of the legs of the occupant 30 toward the center console 42.

With continued reference to FIGS. 1-3, as set forth above, the airbag assembly 14 may be supported by the instrument panel 12. In this configuration, the airbag 18 is configured to contact the tibia, knees, and/or ankles of the occupant 30 in the inflated position. The occupant 30 may be a human occupant 30 or may be a test dummy.

As set forth above, the first extension 22 may be disposed on a left side of the impact surface 20 between the impact surface 20 and the left door 38 door. The second extension 24 may be disposed on a right side of the impact surface 20 between the impact surface 20 and the right door 40 of the vehicle 10 and/or a center console 42 of the instrument panel 12.

The first extension 22 and the second extension 24 may be of identical construction, and common numerals are used herein to refer to common features of the two extensions. One, two, or more extensions may be disposed at various locations about the impact surface 20.

Figure 4:
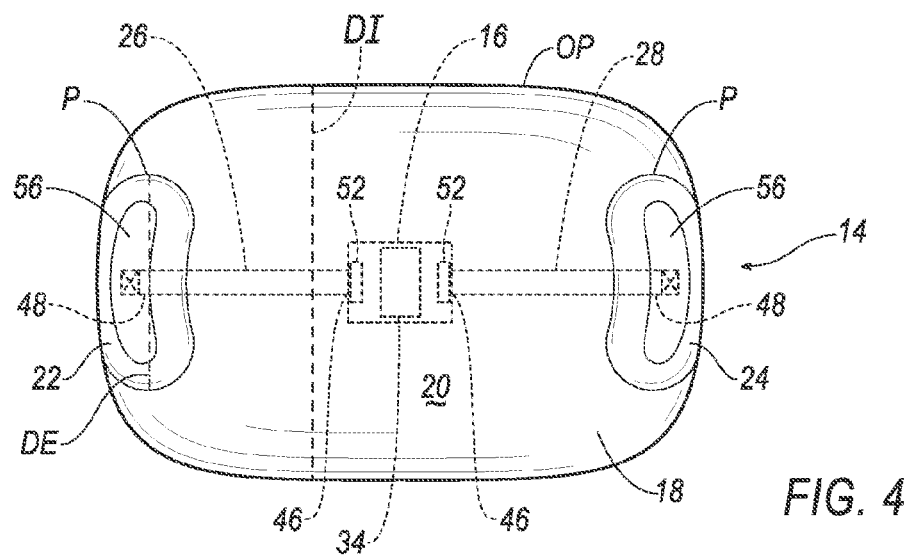
FIG. 4 is a front view of an airbag assembly including the airbag with tethers extending from a base to first and second extensions of the airbag and retaining the extensions in an undeployed position.
Figure 5:
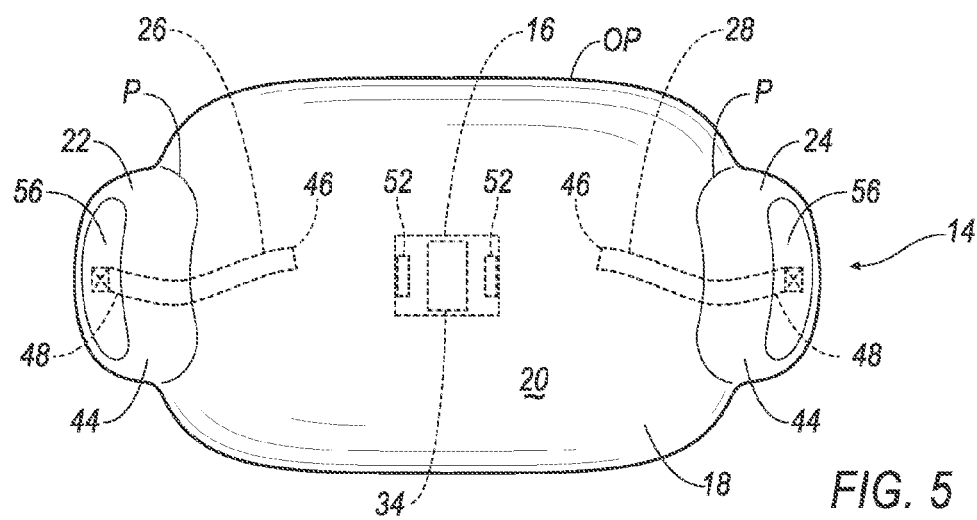
FIG. 5 is a front view of the airbag assembly of FIG. 4 with the tethers released from the base and the extensions in a deployed position.
Figure 6:
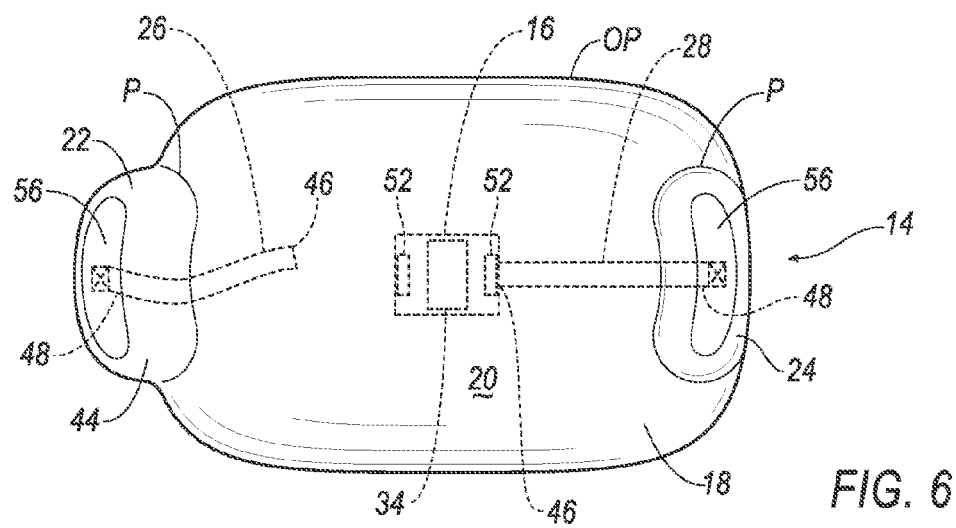
FIG. 6 is a front view of airbag assembly with one of the tethers released from the base and the corresponding extension in the deployed position, and with the other of the tethers retained to the base and the corresponding extension in the undeployed position.
Figure 7:
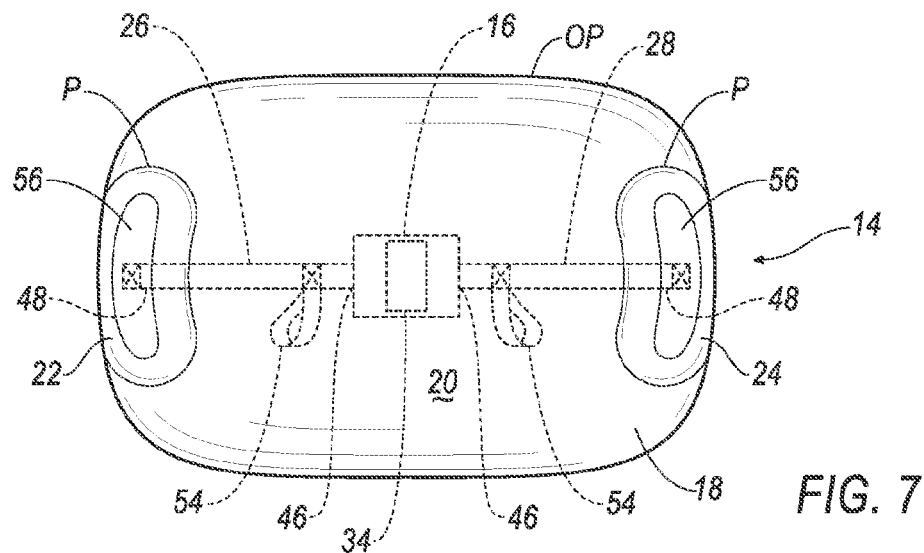
FIG. 7 is a front view of another embodiment of the airbag assembly with the extensions in the undeployed position.
Figure 8:
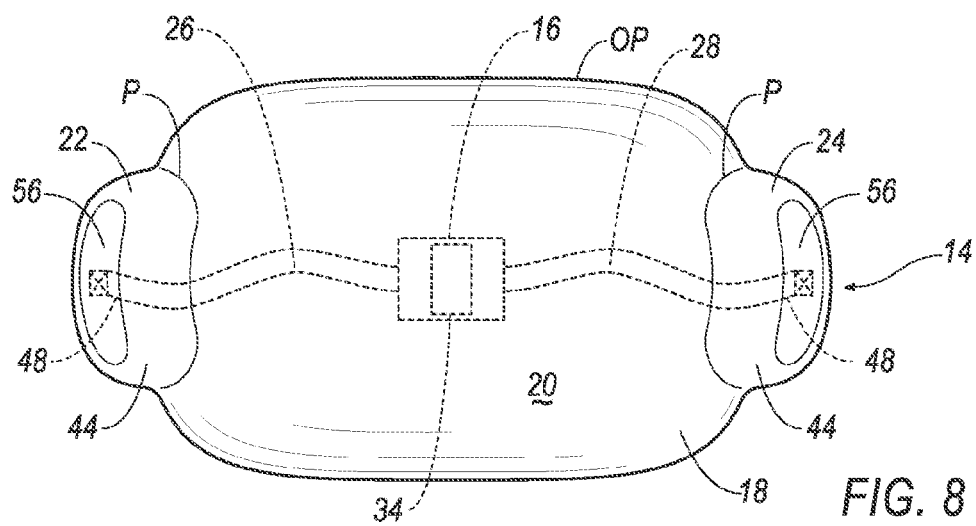
FIG. 8 is a front view of the embodiment of FIG. 7 with the extensions in the deployed position.
Figure 9:
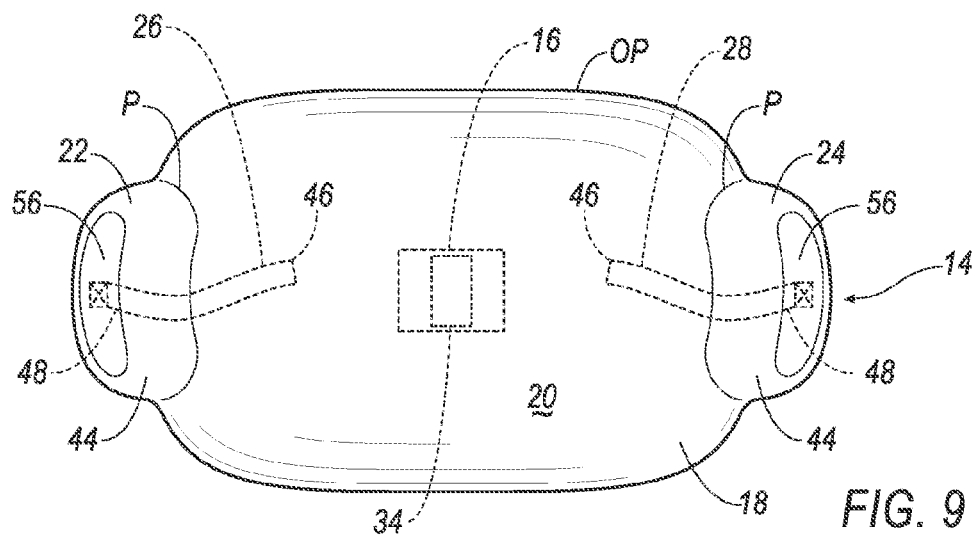
FIG. 9 is a front view of another embodiment of the airbag assembly with the extensions in the deployed position.

As set forth above, a tether 26, 28 is connected from the base 16 to each extension. A first embodiment of the base 16 and tethers 26, 28 is shown in FIGS. 4-6, and a second embodiment of the base 16 and tethers 26, 28 is shown in FIGS. 7-8, and a third embodiment of the base 16 and tethers 26, 28 is shown in FIG. 9. In each of these example embodiments shown in the Figures, the tether 26, 28 may be formed of the same type of material as the airbag 18 or from any other suitable type of material.

In each example embodiment shown in the Figures, the tether 26, 28 extends between a first end 46 and a second end 48. The first end 46 of the tether 26, 28 is anchored when the airbag 18 is in the uninflated position. For example, the first end 46 may be fixed to the base 16 of the airbag 18. Alternatively, for example, the first end 46 may be fixed to the instrument panel 12 or other anchoring point. The first end 46 of the tether may be anchored in any suitable manner, e.g., fusing, adhesive, integral formation (i.e., simultaneous formation of the airbag 18 and the tether 26, 28 fixed to the extension 22, 24), etc.

The second end 48 of the tether 26, 28 is fixed to the extension 22, 24 when the airbag 18 is in the uninflated position. For example, the tether 26, 28 may be stitched to the extension 22, 24, as shown in the figures. Alternatively, the tether 26, 28 may be fixed to the extension 22, 24 in any suitable manner, e.g., fusing, adhesive, integral formation (i.e., simultaneous formation of the airbag 18 and the tether 26, 28 fixed to the extension 22, 24), etc.

The tether 26, 28 is configured to selectively retain the extension 22, 24 in the undeployed position, i.e., a retracted position, relative to the impact surface 20 and to selectively release the extension 22, 24 to the deployed position, i.e., an extended position, relative to the impact surface 20. Specifically, as set forth further below for example, the vehicle 10 includes an impact sensing system 50 that may sense an impact of the vehicle 10 and may trigger inflation of the airbag 18 in response to a sensed impact. In addition, the impact sensing system 50 may sense the type of impact, e.g., based on direction, magnitude, etc.

As set forth above, based on the type of sensed impact, the impact sensing system 50 may trigger release of the tether 26, 28 to allow the extensions 22, 24 to move to the deployed position. For example, if the impact sensing system 50 detects a head-on impact, the tether may retain the extensions 22, 24 in the undeployed position. Alternatively, for example, if the impact sensing system 50 detects an oblique impact, the impact sensing system 50 may trigger release of one or both tethers 26, 28 to release one or both extensions to the deployed position.

With reference to the embodiment of FIGS. 4-6, the base 16 may be configured to selectively release the tether 26 for the first extension 22 and/or the tether 28 for the second extension 24, i.e., configured to select between releasing only tether 26, only tether 28, both tethers 26, 28, or neither tether 26, 28. Specifically, the base 16 may include release mechanisms 52 in communication with the controller 36. The release mechanisms 52 may support the tethers 26, 28, respectively, and may be configured to selective release the tethers 26, 28.

For example, the release mechanisms 52 may include cutters (not shown) configured to cut one or both tethers in response to instructions by the controller 36. Specifically, when the impact sensing system 50 senses a vehicle impact for which one or both extensions 22, 24 should be released to the deployed position, the cutters cut the appropriate tether(s) 26, 28 to allow the extension(s) 22, 24 to be inflated to the deployed position.

As an alternative to the cutter, the release mechanisms 52 may include jaws (not shown) engaged with the tethers 26, 28, respectively. The jaws are configured to retain the tethers until instructed by the controller 36 to release the tether(s).

It should be appreciated that FIG. 6 shows the first extension 22 released to the deployed position and the second extension 24 retained in the undeployed position.

Similarly, although not shown in FIGS. 4-6, the second extension 24 may be released to the deployed position and the first extension 22 may be retained in the undeployed position.

With reference to the embodiments of FIGS. 7-8 and FIG. 9, the airbag system 32 may be configured to inflate the airbag 18 to various inflation pressures in response to various types of impacts to release/not release the tethers. For example, the impact sensing system 50 may be configured to trigger inflation of the airbag 18 to a first inflation pressure to inflate the airbag 18 to the inflated position and retain the extensions 22, 24 in the undeployed position, e.g., in response to types of impact for which it is desired to retain the extensions 22, 24 in the undeployed position. Conversely, the impact sensing system 50 may also be configured to trigger inflation of the airbag 18 to a second inflation pressure higher than the first inflation pressure to inflate the airbag 18 to the inflated position and release the tethers and inflate the extension 22, 24 to the deployed position.

With reference to the embodiment of FIGS. 7-8, the tethers 26, 28 may each include a loop 54 configured to retain the extension 22, 24 in the undeployed position relative to the impact surface 20 when the airbag 18 is inflated to the first inflation pressure and to release by unraveling when the airbag 18 is inflated to the second inflation pressure. For example, the loop 54 may be formed by stitching that is configured to remain connected, i.e., configured to not break, when the airbag 18 is inflated to the first inflation pressure, and is configured to break when the airbag 18 is inflated to the second inflation pressure. In such an embodiment, the loop 54 may be sized to retain the extension 22, 24 in the undeployed position and the tether may be sized such that, when the loop 54 is broken, the tether 26, 28 allows the extension 22, 24 to move to the deployed position. Although only one loop 54 is shown in FIG. 7, the tether 26, 28 may include multiple loop 54s with each loop 54 configured to unravel at different inflation pressures such that the extension 22, 24 may extend to various deployed positions and/or in stages.

In the embodiment of FIGS. 7-8, the airbag system 32 may be configured to selectively retain both extensions 22, 24 in the undeployed position or release both tethers 26, 28 to the deployed position. In other words, both extensions 22, 24 may act in concert. Alternatively, the airbag system 32 may be configured to selectively release one of the extensions 22, 24 to the deployed position and retain the other of the extensions 22, 24 in the undeployed position, i.e., the extensions 22, 24 may move independently from the undeployed position to the deployed position. For example, the airbag system 32 may include multiple inflators, baffles, additional tethers, etc., to inflate independently retain the extensions 22, 24 in the undeployed position or release the extensions 22, 24 to the deployed position.

With reference to the embodiment of FIG. 9, the tethers 26, 28 may be configured remain connected from the base 16 to the extension 22, 24 when the airbag 18 is inflated to the first inflation pressure (not shown) and to break between the base 16 and the extension 22, 24 when the airbag 18 is inflated to the second inflation pressure higher than the first inflation pressure, as shown in FIG. 9. For example, when the airbag 18 is inflated to the second inflation pressure, the first end 46 of the tether 26, 28 may release by separating from base 16, e.g., in the configuration where the first end 46 is stitched or adhered to the base 16, the stitching or adhesive between the first end 46 and the base 16 may break when the airbag 18 is inflated to the second inflation pressure.

Alternatively, with continued reference to the embodiment of FIG. 9, the tether may be configured to release by breaking between the first end 46 and the second end 48. For example, the tether 26, 28 may include a weakened area (not shown) between the first end 46 and the second end 48 that is configured to remain connected, i.e., configured to not break, when the airbag 18 is inflated to the first inflation pressure, and is configured to release by breaking when the airbag 18 is inflated to the second inflation pressure. As another example, the tether 26, 28 may include a break (not shown) between the first end 46 and the second end 48 that is stitched together with stitching configured to remain connected, i.e., configured to not break, when the airbag 18 is inflated to the first inflation pressure, and is configured to release by breaking when the airbag 18 is inflated to the second inflation pressure.

In the embodiment of FIG. 9, the airbag system 32 may be configured to selectively retain both extensions 22, 24 in the undeployed position or release both tethers 26, 28 to the deployed position. In other words, both extensions 22, 24 may act in concert. Alternatively, the airbag system 32 may be configured to selectively release one of the extensions 22, 24 to the deployed position and retain the other of the extensions 22, 24 in the undeployed position, i.e., the extensions 22, 24 may move independently from the undeployed position to the deployed position. For example, the airbag system 32 may include multiple inflators, baffles, additional tethers, etc., to inflate independently retain the extensions 22, 24 in the undeployed position or release the extensions 22, 24 to the deployed position.

With reference to FIGS. 4-9, when the airbag 18 is in the inflated position and the extension 22, 24 is in the undeployed position, the extension 22, 24 may be flush with the impact surface 20 around the perimeter P of the extension 22, 24. Alternatively, the extension 22, 24 in the undeployed position may be slightly indented or slightly bulged outwardly relative to the impact surface 20 around the perimeter P of the extension 22, 24. When the airbag 18 is in the inflated position and the extension 22, 24 is in the deployed position, the extension 22, 24 extends farther outwardly relative to the impact surface 20. As set forth above, the perimeter surface 44 of the extension 22, 24 extends transversely from the impact surface 20 around the perimeter P of the extension 22, 24.

As set forth above, the perimeter surface 44 of the extension 22, 24 extends around the perimeter P of the extension 22, 24. In other words, the perimeter surface 44 is continuous, and the perimeter surface 44 extends entirely around and encloses the portion of the inflation chamber that extends into the extension 22, 24.

As set forth above, the perimeter surface 44 extends transversely from the impact surface 20. In other words, the perimeter surface 44 extends along a path that crosses a line along which the impact surface 20 extends near the extension 22, 24. The perimeter surface 44 may extend at a right angle, i.e., 90 degrees, relative to the impact surface 20. A transition from the perimeter surface 44 to the impact surface 20 16 may be angular or may be rounded.

The extension 22, 24 includes an end 56 spaced from the impact surface 20. The second end 48 of the tether 26, 28 may be connected to the end 56. The end 56 may be flat, as shown in FIGS. 2-9, or may be rounded. The extension 22, 24 shown in FIGS. 2-7 has a kidney shaped cross-section, however, the extension 22, 24 may have any suitable shape.

With reference to FIGS. 2-9, the impact surface 20 is the surface of the airbag 18 directly in front of the occupant 30 and may be the surface that the occupant 30 initially impacts during a vehicle impact. The impact surface 20 may extend in a cross-vehicle direction. For example, the impact surface 20 may extend in a plane generally perpendicular to the longitudinal axis of the vehicle 10. The impact surface 20 may extend to an outer perimeter OP of the airbag 18. The diameter DE (identified in FIG. 4) of the extension 22, 24 through the perimeter surface 44 is less than a diameter DI (identified in FIG. 4) of the impact surface 20.

During inflation of the airbag 18 from the uninflated position to the inflated position, the airbag 18 extends in a first direction D from the base 16 to the impact surface 20. Specifically, the first direction D extends generally in a vehicle-rearward direction from the base 16 to the impact surface 20, e.g., in parallel with the longitudinal axis of the vehicle 10. During inflation of the extension 22, 24 from the undeployed position to the deployed position, the extension 22, 24 extends from the impact surface 20 in the first direction. In other words, the extension 22, 24 extends from the impact surface 20 in the same direction as the airbag 18 extends from the base 16.

The inflation chamber is inflated with an inflation medium, as set forth further below. The inflation chamber extends into the extensions 22, 24 when the extensions 22, 24 are in the deployed position. The inflation chamber may be open to the extensions 22, 24 along the entire inside perimeter of the extensions 22, 24. Alternatively, for example, a vent may be disposed in the inflation chamber at the extensions 22, 24 for controlling gas flow into the extensions 22, 24.

The airbag 18 may be formed of any suitable type of material, e.g., from a woven polymer. For example, the airbag 18 may be formed of woven nylon yarn, e.g., nylon 6, 6. Other suitable examples include polyether ether ketone (PEEK), polyetherketoneketone (PEKK), polyester, or any other suitable polymer. The woven polymer may include a coating, such as, for example, silicone, neoprene, urethane, etc. For example, the coating may be polyorgano siloxane.

As set forth above, the airbag assembly 14 includes the inflator 34 (shown schematically in FIG. 10) in communication with the inflation chamber to expand the inflation chamber with the inflation medium, such as a gas. The inflator 34 may be, for example, a pyrotechnic inflator 34 that uses a chemical reaction to drive inflation medium to the inflation chamber. The inflator 34 may be of any suitable type, for example, a cold-gas inflator 34.

The base 16 of the airbag 18 module may be define a cavity (not shown) that houses the airbag 18 in the uninflated position. The base 16 may support the inflator 34 and may be mounted to the instrument to support the airbag assembly 14 on the instrument panel 12. The base 16 may be mounted to the instrument panel 12 in any suitable manner.

A schematic of the airbag system 32, including the impact sensing system 50, is shown in FIG. 10. The impact sensing system 50 may include at least one impact sensor 58 for sensing impact of the vehicle 10. The impact sensor 58 is the only component of the impact sensing system 50 shown in FIG. 10, however, it should be appreciated that the impact sensing system 50 may include additional components not shown in FIG. 10.

The controller 36 and the sensor 58 may be connected to a communication bus 60, such as a controller area network (CAN) bus, of the vehicle 10. The controller 36 may use information from the communication bus to control the activation of the inflator 34. The inflator 34 may be connected to the controller 36, as shown in FIG. 8, or may be connected directly to the communication bus 60.

The controller 36 may be in communication with the sensor 58 and the inflator 34, directly or through the communication bus 60, for activating the inflator 34, e.g., for providing an impulse to a pyrotechnic charge of the inflator 34, when the sensor 58 senses an impact of the vehicle 10. Alternatively or additionally to sensing impact, the impact sensing system 50 may be configured to sense impact prior to impact, i.e., pre-impact sensing. The sensor 58 may be of any suitable type, e.g., using radar, lidar, and/or a vision system. The vision system may include one or more cameras, CCD image sensor 58s, and/or CMOS image sensor 58, etc.

The controller 36 may be a microprocessor-based controller. The sensor 58 is in communication with the controller 36 to communicate data to the controller 36. Based on the data communicated by the sensor 58, the controller 36 instructs the inflator 34 to activate.

In operation, the airbag 18 is in an uninflated position, as shown in FIG. 1, under normal operating conditions of the vehicle 10. When the sensor 58 senses an impact of the vehicle 10, the impact sensing system 50 triggers communication to the controller 36 identifying the impact. In response, the controller 36 instructs the inflator 34 to inflate the airbag 18 with the inflation medium from the uninflated position to an inflated position. Based on the type of impact sensed by the impact sensing system 50, the controller 36 may selectively retain one or both of the extensions 22, 24 in the undeployed position or may selectively release one or both of the extensions 22, 24 to the deployed position as set forth above.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An airbag system for a vehicle, the airbag system comprising:
   an inflator;
   an airbag defining an inflation chamber in communication with the inflator;
   the airbag including a first extension and a second extension spaced from each other and each in communication with the inflation chamber and each selectively inflatable from an undeployed position to a deployed position; and
   a controller programmed with instructions including at least instructions to release the first extension to the deployed position and retain the second extension in the undeployed position and instructions to retain the first extension in the undeployed position and release the second extension to the deployed position and to alternatively provide one of the instructions to the inflator in response at least to a detected direction of an impact of the vehicle.

2. The airbag system as set forth in claim 1 further comprising a base, a first tether extending from the base to the first extension, and a second tether extending from the base to the second extension.

3. The airbag system as set forth in claim 2 wherein the base is configured to selectively release the first tether and/or the second tether in response to the instructions from the controller.

4. The airbag system as set forth in claim 2 wherein the base is configured to selectively sever the first tether and/or the second tether in response to the instructions from the controller.

5. The airbag system as set forth in claim 2 wherein the base is configured to selectively sever the first tether and/or the second tether and wherein the instructions include instructions for the base to sever the first tether and retain the second tether in response to sensing a left oblique impact and instructions for the base to cut the second tether and retain the first tether in response to sensing a right oblique impact.

6. The airbag system as set forth in claim 1 further comprising an impact sensor in communication with the controller and configured to sense the impact of the vehicle.

7. The airbag system as set forth in claim 1 wherein the controller is in communication with the inflator.

8. The airbag system as set forth in claim 1 wherein the airbag includes an impact surface and wherein the first extension and the second extension each include a perimeter surface extending transversely from the impact surface around a perimeter of the first extension and second extension, respectively.

9. The airbag system as set forth in claim 8 wherein a diameters of the first extension and the second extension through each perimeter surface, respectively, is less than a diameter of impact surface.

10. The airbag system as set forth in claim 1 further comprising an impact sensing system in communication with the controller and configured to detect the direction of impact of the vehicle.

11. The airbag system as set forth in claim 10 wherein the impact sensing system includes an impact sensor for detecting the impact.

12. A vehicle comprising:
an instrument panel;
an airbag assembly including a base supported by the instrument panel and an airbag supported by the base, the airbag being inflatable from an uninflated position to an inflated position and presenting an impact surface spaced from the instrument panel in the inflated position;
the airbag including an extension and a tether extending from the base to the extension in the uninflated position;
wherein the extension has a perimeter surface extending transversely from the impact surface around a perimeter of the extension; and
wherein the tether includes a loop configured to retain the extension in an undeployed position relative to the impact surface when the airbag is inflated to a first inflation pressure and to unravel when the airbag is inflated to a second inflation pressure higher than the first inflation pressure.

13. The vehicle as set forth in claim 12 wherein a diameter of the extension through the perimeter surface is less than a diameter of the impact surface.

14. The vehicle as set forth in claim 12 wherein the extension is positioned along an edge of the impact surface.

15. The vehicle as set forth in claim 12 wherein the airbag extends in a first direction from the base to the impact surface and wherein the extension extends from the impact surface in the first direction.

16. The vehicle as set forth in claim 12 wherein the airbag assembly includes an inflator in communication with the airbag.

\* \* \* \* \*